United States Patent Office 3,267,161
Patented August 16, 1966

3,267,161
CHLORINATION PROCESS
Rokuo Ukaji, Ibaraki, Keiichi Maruo, Toyonaka, Susumu Misaki, Sakai, and Shigeyoshi Ogawa, Suita, Japan, assignors to Osaka Kinzoku Kogyo Company, Limited, Osaka, Japan, a juridical person of Japan
No Drawing. Filed July 19, 1963, Ser. No. 296,400
Claims priority, application Japan, July 26, 1962, 37/31,830; Jan. 31, 1963, 38/5,020
4 Claims. (Cl. 260—659)

This invention relates to the chlorination of hydrocarbons. More particularly, the invention pertains to the production of chlorinated derivatives of hydrocarbons, such as carbon tetrachloride and vinyl chloride, from lower aliphatic hydrocarbons and their partially chlorinated hydrocarbons.

According to a method known in the art disclosed, for instance, in the United States Patents 2,674,633 and 2,752,401, the hydrocarbon to be chlorinated is passed at a high temperature in contact with a catalyst such as $FeCl_3$, $NiCl_2$, $CuCl_2$, $ZnCl_2$ or $CuCl_2$-KCl, together with gaseous hydrogen chloride and/or chlorine as a chlorinating agent, and an oxygen containing gas such as air.

The employment of the catalyst as specified above, however, is not necessarily profitable. Analyses show that the hydrocarbon being chlorinated is generally burned or oxidized to a loss of no less than 20 percent by weight or thereabout in the chlorination process. Selective replacement of hydrogen atoms of the hydrocarbon with chlorine also takes place inadequately. In the prior art, consequently, the unreacted hydrocarbon has to be recycled if economic yields of alkane perchlorides are to be obtained, and the unprofitable addition reaction of chlorine and/or hydrogen chloride with the alkene cannot be eliminated in the production of chloroalkenes such as vinyl chloride.

One object of the invention is accordingly to provide a method for substantially diminishing the loss of the starting hydrocarbons due to hydrocarbon burning during the chlorination step, whereby markedly improving the ultimate yield of the desired chlorinated products.

Another object of the invention is to provide a method for obtaining hydrocarbon perchlorides in a single pass, that is, without recycling the unreacted hydrocarbons or chlorinated derivatives thereof.

A further object of the invention is to provide a method for producing chlorinated derivatives of alkenes without subjecting the double bond of the alkene to addition reaction with chlorine.

Other objects and specific features of the invention will be apparent from the detailed description hereinbelow.

It has been found according to the invention that the disadvantageous burning or combustion of hydrocarbons resulting from the employment of a conventional catalyst such as $CuCl_2$ can be effectively prevented by the employment of $LaCl_3$ or $LaCl_3$ and $LdCl_3$ in combination with $CuCl_2$, Ld being a lanthanide selected from the group consisting of elements ranging from the 58th element cerium to the 71st element lutetium in the Periodic Table.

In the invention, in more detail, there is employed as a catalyst a mixture consisting of 50 to 90 weight percent $CuCl_2$ and 50 to 10 weight percent $LaCl_3$, or preferably a mixture comprising 50 to 90 weight percent $CuCl_2$, 25 to 5 weight percent $LaCl_3$ and 25 to 5 weight percent $LdCl_3$. Best results are obtained when the composition ratio by weight of Cu to La in the former case and that of Cu to La and Ld in the latter case is $1:\frac{1}{2}$ to $\frac{1}{3}$. To prevent the volatilization of the catalyst content, an alkali metal chloride such as potassium chloride is preferably employed in the order of less than 10 weight percent as against the entire amount of the catalyst used.

In the invention, an oxide or a chloride of metal to be employed as a catalyst content is dissolved with heat in hydrochloric acid, whereby converting the metal oxide into a chloride, and the solution is impregnated in a porous material, and dried. It has been found that the most desirable results are obtained with a carrier having a surface area ranging from 0.3 to 30 $m.^2/g$. when measured in accordance with the BET method, a porosity in the order of from 0.1 to 0.8 cc./g., particularly from 0.2 to 0.5 cc./g., when measured in accordance with the carbon tetrachloride replacing method (Analytical Chemistry, 27, 1963-5 (1955)), and the ratio of volume to surface (computed as a radius of an assumed uniform circular cylinder having the total pore surface and total pore volume) in the order of about 3,000 Angstroms. Materials employed as a catalyst carrier in the invention comprise pumice, brick, diatomaceous earth, silica gel, titanium oxide gel, porcelain clay, alumina and other well known carrier materials except carbon because of its burning. Particularly suitable materials are pumice and brick.

The hydrocarbon to be chlorinated in the invention comprises alkanes having from 1 to 4 carbon atoms, alkenes having from 2 to 4 carbon atoms, and their partially or incompletely chlorinated derivatives. Production of by-products is proportionate to the number of the carbon atoms. When produced, by-products are profitably removed by distillation or other suitable methods.

The chlorinating agent employed in the invention is gaseous hydrogen chloride or chlorine or a mixture of both. The agent can be employed almost theoretically, because the hydrocarbon combustion or burning is substantially reduced as stated before. There is employed in the invention, for instance, 0.5 to 1 mole, preferably 0.8 mole or thereabout, of HCl, or 0.3 to 0.5 mole, preferably 0.4 to 0.5 mole, of $Cl_2$ for each hydrogen atom to be replaced. Chlorination degree of the ultimate products can thus be easily controlled in the invention by a selective choice in the amount of the chlorinating agent in relation to the starting hydrocarbons and the residence time of the gases in the catalyst zone.

The oxygen containing gas employed in combination with the hydrocarbon to be chlorinated and the chlorinating agent as specified above is air or an oxygen which is diluted with an inactive gas such as nitrogen, helium, argon or carbon dioxide. The oxygen content for the most effective control of the hydrocarbon burning ranges from 10 to 30 percent by volume, and the composition ratio of said oxygen for each mole of the chlorinating agent is preferably from 0.5 to 1.2 mole. The ratio of replacement of the hydrogen atoms with chlorine can thus be accurately controlled in the invention, and the reaction is carried out very effectively.

In the invention, moreover, the conventional loss of feed materials due to the hydrocarbon burning is substantially confined to 5 to 6 percent by weight with the ultimate yield of 90 percent by weight or thereabout, even when oxygen is supplied in an excess amount which cannot be practically employed in the prior art, as will be disclosed hereinafter, particularly in Example 6.

In actual operation, the aforesaid catalyst is charged in a tubular reactor and the catalyst zone is heated to 350° to 550° C. by means of an electric furnace or other suitable heating device. A mixture of the hydrocarbon to be chlorinated, an oxygen containing gas and a chlorinating agent as specified above is fed at one end of the reactor. To control the rising temperature in the hot spots and to maintain an even reaction temperature throughout the reactor, air or other suitable cooling medium is preferably passed through the catalyst zone by means of a pipe or any other suitable device provided in the zone. The resultant gaseous product is collected at the end of the reactor opposite the feed inlet, washed with water and alkali solution to remove the unreacted chlorinating agent and the by-product carbon dioxide, dried to remove the aqueous content, and cooled in a cold trap to condense.

The residence time of the gases in the catalyst zone is dependent upon the species of hydrocarbon feed materials and that of desired products. For instance, a period ranging from 2 to 8 seconds is long enough for producing partially chlorinated mono- or dichlorides. This method of partial chlorination is profitably employed for producing lower chloroalkenes, such as vinyl chloride and allyl chloride. To obtain completely chlorinated products, on the other hand, the time for the gases to remain in the catalyst zone should be prolonged to 10 to 20 seconds. Said perchlorinating method is employed for the production of perchlorinated alkanes, such as carbon tetrachloride and hexachloroethane.

In the invention, as stated hereinbefore, hydrocarbon burning or combustion is substantially controlled, and chlorination is carried out selectively with resultant high yields. Perchlorination, moreover, is carried out in a single pass, namely, without resorting to the recycling of unreacted gases, and alkenes can be chlorinated preferentially in said manner without formation of olefine adducts. Such outstanding features of the present invention have not, until the advent of the same, been attained or disclosed in the prior art.

Preferred examples illustrative of the manner in which the principles of the present invention can be carried out are as follows:

Example 1

To an aqueous solution of 200 cc. of 5 weight percent HCl in 300 cc. of water were added 18 grams of $CuCl_2 \cdot 2H_2O$ and 7 grams of $La_2O_3$, and boiled for 30 minutes to convert the $La_2O_3$ into $LaCl_3$. To the resultant solution were added 150 grams of 10 to 20 mesh pumice particles and allowed to soak for a period of 24 hours at room temperature. The supernatant liquor was drained off and the particles impregnated with the catalyst were dried in vacuo at 110° C. The resultant dried particles contained 7.0 percent $CuCl_2$ and 2.5 percent $LaCl_3$ by weight of impregnated carrier.

As a reactor, there was employed in the example a quartz tube, 1,200 mm. long and 30 mm. in inside diameter, provided with two quartz pipes passing therethrough, one of which, 12 mm. in outside diameter, is for passing a cooling medium and the other, 5 mm. in outside diameter, for sliding a thermocouple to locate the eventual hot spots.

In said reactor were charged 130 grams of the catalyst impregnated particles prepared in a manner as described before with 20 mm. from the feed inlet free of catalyst, and the reactor was horizontally housed in a horizontally disposed tubular electric furnace provided with a thermoregulator for controlling the reaction temperature. The catalyst zone was then heated to 450° C., and a mixture comprising by volume 6.7 percent $CH_4$, 21.5 percent HCl and 72.8 percent air was fed into the reactor at the feed inlet. The temperature of the catalyst zone was maintained at 450°±10° C. by passing cooling air through the cooling pipe, allowing the gas mixture to remain in contact with the catalyst for approximately 15 seconds. The reaction product was then collected at the end of the reactor opposite the feed inlet; washed with water and an aqueous solution of 10 weight percent sodium hydroxide both at 80° C. to remove the unreacted chlorinating agent and the by-product carbon dioxide; dried with calcium chloride at 80° C. to remove the aqueous content; and cooled in a cold trap held at −40° C. with Dry Ice and trichloroethane to condense the resultant product. Each of the components of the aforesaid gas mixture feed was taken from a respective bomb or cylinder through a needle valve and metered through a rotameter.

Vapor phase chromatographic analyses showed:

Composition in molar percent of the ultimate product:

| | |
|---|---|
| $CCl_4$ | 77.6 |
| $CHCl_3$ | 18.6 |
| $CH_2Cl_2$ | 2.6 |
| $CH_3Cl$ | 1.2 |

Unreacted gases in volume percent contained in the dried chlorides prior to the entrance to the cold trap:

| | |
|---|---|
| $CH_4$ | 1.85 |
| $O_2$ | 6.81 |

Utilization in molar percent:

| | |
|---|---|
| $CH_4$ (chlorinated $CH_4/CH_4$ supply) | 76.8 |
| HCl (HCl consumed in chlorinating $CH_4$/HCl supply) | 91.5 |
| $O_2$ ($O_2$ consumed in oxidizing HCl consumed in chlorinating $CH_4/O_2$ supply) | 65.9 |

Loss of $CH_4$ due to burning was no more than 5.66 percent by volume of $CH_4$ supply.

For the sake of comparison, conventional catalysts were employed in the following manners:

$NiCl_2$ was impregnated in pumice particles in the order of 15.3 percent by weight of impregnated carrier. A mixture comprising by volume 7.6 percent $CH_4$, 25.2 percent HCl and 67.2 percent air was chlorinated with said catalyst in the same reactor under the same conditions and purified in the same manners as employed and described hereinbefore. Utilization as defined above of $CH_4$, HCl and $O_2$ was respectively no more than 2.7, 2.4 and 2.3 molar percent, and $CH_4$ loss due to burning was 36.2 percent by volume of $CH_4$ supply.

In another instance, $ZnCl_2$ was impregnated in pumice particles in the order of 14.7 percent by weight of impregnated carrier. A mixture comprising by volume 7.2 percent $CH_4$, 23.7 percent HCl and 69.1 percent air was chlorinated with said catalyst in the same reactor under the same conditions and purified in the same manners as employed and described hereinbefore. Utilization as defined before of $CH_4$, HCl and $O_2$ was respectively 2.2, 2.3 and 2.0 molar percent, and $CH_4$ loss due to burning was 34.3 percent by volume of $CH_4$ supply.

In a further instance, $CuCl_2$-KCl was impregnated in pumice particles in the order of 6.5 percent $CuCl_2$ and 2.2 percent KCl by weight of impregnated carrier. A mixture comprising by volume 8.7 percent $CH_4$, 25.9 percent HCl and 65.4 percent air was chlorinated with said catalyst in the same reactor under the same conditions and purified in the same manners as employed and described hereinbefore. Utilization as defined before of $CH_4$, HCl and $O_2$ was respectively 58.7, 64.4 and 52.1 molar percent, and $CH_4$ loss due to burning was 26.4 percent by volume of $CH_4$ supply.

Example 2

A mixture of 18 grams of $CuCl_2 \cdot 2H_2O$, 3.5 grams of $La_2O_3$ and 2.6 grams of $Ce_2O_3$ was boiled for 30 minutes in 200 cc. of 5 weight percent HCl in 300 cc. of water and impregnated in 150 grams of 10 to 20 mesh pumice particles under the same conditions as described in Example 1. The resultant catalyst impregnated particles contained 6.8 percent $CuCl_2$, 1.3 percent $LaCl_3$ and 1.1 percent $CeCl_3$ by weight of impregnated carrier.

A mixture comprising by volume 7.4 percent $CH_4$, 23.9 percent HCl and 68.7 percent air was then chlorinated with said catalyst in the same reactor under the same conditions and purified in the same manners as employed and described in Example 1. Findings were as follows:

Composition in molar percent of the resultant chlorides:

| | |
|---|---|
| $CCl_4$ | 77.9 |
| $CHCl_3$ | 18.6 |
| $CH_2Cl_2$ | 2.5 |
| $CH_3Cl$ | 1.0 |

Unreacted gases in volume percent as defined in Example 1:

CH$_4$ ------------------------------------------ 0.567
O$_2$ ------------------------------------------- 5.38

Utilization in molar percent as defined in Example 1:

CH$_4$ ------------------------------------------ 77.4
HCl -------------------------------------------- 88.7
O$_2$ ------------------------------------------- 71.5

CH$_4$ loss due to burning: 5.24 percent by volume of CH$_4$ supply.

*Example 3*

A mixture comprising by volume 16.9 percent CH$_2$Cl$_2$, 32.1 percent HCl and 51.0 percent air was chlorinated with the same catalyst in the same reactor under the same conditions and purified in the same manners as employed and described in Example 2. Findings were as follows:

Composition in molar percent of the ultimate product:

CCl$_4$ ----------------------------------------- 82.6
CHCl$_3$ ---------------------------------------- 17.4

Unreacted gases in volume percent as defined in Example 1:

CH$_2$Cl$_2$ ------------------------------------ 4.6
O$_2$ ------------------------------------------- 5.72

Utilization in molar percent:

CH$_2$Cl$_2$ (chlorinated CH$_2$Cl$_2$/CH$_2$Cl$_2$ supply) ---- 79.5
HCl (HCl consumed in chlorinating CH$_2$Cl$_2$/CH$_2$Cl$_2$ supply) -------------------------------------- 75.0
O$_2$ (O$_2$ consumed in oxydizing HCl consumed in chlorinating CH$_2$Cl$_2$/O$_2$ supply) ------------- 59.6

CH$_2$Cl$_2$ loss due to burning: 5.7 percent by volume of CH$_2$Cl$_2$ supply.

*Example 4*

A mixture comprising by volume 15.1 percent CH$_3$CH$_3$, 15.1 percent HCl and 69.8 percent air was chlorinated with the same catalyst in the same reactor under the same conditions and purified in the same manners as described in Example 2, except the residence period of the gas mixture in the catalyst zone was raised to 10 seconds. Findings were as follows:

Composition in molar percent of the ultimate product:

CH$_3$CH$_2$Cl ----------------------------------- 75.0
CCl$_2$HCH$_3$ ----------------------------------- 22.0
C$_2$Cl$_3$H$_3$ --------------------------------- 2.8
CH$_2$ClCH$_2$Cl --------------------------------- 0.2

Unreacted gases in volume percent as defined in Example 1:

CH$_3$CH$_3$ ------------------------------------- 3.82
O$_2$ ------------------------------------------- 6.3

Utilization in molar percent:

CH$_3$CH$_3$ (chlorinated CH$_3$CH$_3$/CH$_3$CH$_3$ supply) -- 73.1
HCl (HCl consumed in chlorinating CH$_3$CH$_3$/HCl supply) -------------------------------------- 93.1
O$_2$ (O$_2$ consumed in oxydizing HCl consumed in chlorinating CH$_3$CH$_3$/O$_2$ supply) ------------- 46.7

CH$_3$CH$_3$ loss due to burning: 7.85 percent by volume of CH$_3$CH$_3$ supply.

*Example 5*

A mixture comprising by volume 12.4 percent CH$_4$, 22.1 percent Cl$_2$ and 65.5 percent air was chlorinated with the same catalyst in the same reactor under the same conditions and purified in the same manners as employed and described in Example 2. Findings were as follows:

Composition in molar percent of the ultimate product:

CCl$_4$ ----------------------------------------- 60.0
CHCl$_3$ ---------------------------------------- 34.9
CH$_2$Cl$_2$ ------------------------------------ 3.0
CH$_3$Cl ---------------------------------------- 2.1

Unreacted gases in volume percent as defined in Example 1:

CH$_4$ ------------------------------------------ 2.03
O$_2$ ------------------------------------------- 5.12

Utilization in molar percent:

CH$_4$ (chlorinated CH$_4$/CH$_4$ supply) ------------ 84.6
Cl$_2$ (Cl$_2$ consumed in chlorinating CH$_4$/Cl$_2$ supply) - 84.0
O$_2$ (O$_2$ consumed in oxydizing HCl consumed in chlorinating CH$_4$/O$_2$ supply) ----------------- 72.9

CH$_4$ loss due to burning: 4.52 percent by volume of CH$_4$ supply.

*Example 6*

CuCl$_2$, LaCl$_3$, LdCl$_3$ and KCl were impregnated in pumice particles in the order of 7.1 percent CuCl$_2$, 1.4 percent LaCl$_3$, 1.2 percent LdCl$_3$ and 0.8 percent KCl by weight of impregnated carrier.

A mixture comprising by volume 8.48 percent CH$_4$, 14.58 percent Cl$_2$ and 76.94 percent air was chlorinated with said catalyst in the same reactor under the same conditions and purified in the same manners as employed and described in Example 2, except the residence period of the gas mixture in the catalyst zone was raised to 10 seconds. Findings were as follows:

Composition in molar percent of the ultimate product:

CCl$_4$ ----------------------------------------- 61.9
CHCl$_3$ ---------------------------------------- 29.9
CH$_2$Cl$_2$ ------------------------------------ 3.2
CH$_3$Cl ---------------------------------------- 5.0

Unreacted gases in volume percent as defined in Example 1:

CH$_4$ ------------------------------------------ 0.6
O$_2$ ------------------------------------------- 11.1

Utilization in volume percent as defined in Example 5:

CH$_4$ ------------------------------------------ 89.1
Cl$_2$ ------------------------------------------ 90.2
O$_2$ ------------------------------------------- 41.6

CH$_4$ loss due to burning: 5.44 percent by weight of CH$_4$ supply.

*Example 7*

A mixture comprising by volume 10.4 percent CH$_4$, 8.8 percent HCl, 13.8 percent Cl$_2$ and 67.0 percent air was chlorinated with the same catalyst in the same reactor under the same conditions and purified in the same manners as employed and described in Example 2. Findings were as follows:

Composition in molar percent of the ultimate product:

CCl$_4$ ----------------------------------------- 58.3
CHCl$_2$ ---------------------------------------- 25.1
CH$_2$Cl$_2$ ------------------------------------ 8.0
CH$_3$Cl ---------------------------------------- 8.6

Unreacted gases in volume percent as defined in Example 1:

CH$_4$ ------------------------------------------ 1.59
O$_2$ ------------------------------------------- 5.1

Utilization in molar percent as defined in Examples 1 and 5:

CH$_4$ ------------------------------------------ 86.5
HCl -------------------------------------------- 49.2
Cl$_2$ ------------------------------------------ 93.2
O$_2$ ------------------------------------------- 72.0

$CH_4$ loss due to burning: 3.32 percent by volume of $CH_4$ supply.

Example 8

A mixture comprising by volume 15.5 percent $CH_4$, 18.1 percent HCl and 68.4 percent air was chlorinated with the same catalyst in the same reactor under the same conditions and purified in the same manners as employed and described in Example 2, except the residence period of the gas mixture in the catalyst zone was reduced to 4 seconds. Findings were as follows:

Composition in molar percent of the ultimate product:

| | |
|---|---|
| $CCl_4$ | 4.5 |
| $CHCl_3$ | 15.8 |
| $CH_2Cl_2$ | 30.8 |
| $CH_3Cl$ | 48.9 |

Unreacted gases in volume percent as defined in Example 1:

| | |
|---|---|
| $CH_4$ | 5.84 |
| $O_2$ | 5.6 |

Utilization in volume percent as defined in Example 1:

| | |
|---|---|
| $CH_4$ | 55.2 |
| HCl | 87.0 |
| $O_2$ | 49.1 |

$CH_4$ loss due to burning: 5.44 percent by volume of $CH_4$ supply.

Example 9

To an aqueous solution of 200 cc. of 5 weight percent HCl in 300 cc. of water were added 16.5 grams of $CuCl_2 \cdot 2H_2O$, 3 grams of $La_2O_3$ and 2.2 grams of $Ce_2O_3$ and boiled for about 30 minutes. To the resultant solution were further added 140 grams of from 10 to 20 mesh pumice particles and allowed to soak for a period of 24 hours at room temperature. The supernatant liquor was drained off and the particles were dried in vacuo at 110° C. The resultant catalyst impregnated particles contained 6 percent $CuCl_2$, 0.9 percent $LaCl_3$ and 1.1 percent $CeCl_3$ by weight of impregnated carrier.

A mixture comprising by volume 12.5 percent $C_2H_4$, 25.0 percent HCl and 62.5 percent air was chlorinated with said catalyst in the same reactor under the same conditions and purified in the same manners as employed and described in Example 1, except the catalyst zone was heated to 400° C. and the gas mixture was allowed to remain in contact with said zone for 5 seconds. Findings were as follows:

Composition in molar percent of the ultimate product:

| | |
|---|---|
| $CH_2:CHCl$ | 91.0 |
| $CH:CCl_2$ | 6.0 |
| $CHCl:CHCl$ | 1.5 |
| $CH_2ClCH_2Cl$ | 0.5 | with a residence of unknown composition amounting to 1 molar percent.

Unreacted gases in volume percent as defined in Example 1:

| | |
|---|---|
| $C_2H_4$ | 3.5 |

Utilization in molar percent:

| | |
|---|---|
| $C_2H_4$ (chlorinated $C_2H_4/C_2H_4$ supply) | 92.5 |

$C_2H_4$ loss due to burning: 4.0 percent by volume of $C_2H_4$ supply.

Example 10

A mixture comprising by volume 22.3 percent $CH_3CH:CH_2$, 22.3 percent HCl and 55.4 percent air was chlorinated with the same catalyst in the same reactor under the same conditions and purified in the same manners as employed and described in Example 7, except the catalyst zone was heated to 450° C. and the gas mixture was allowed to remain in contact with the catalyst zone for 6 seconds. The resultant product contained 85 molar percent allyl chloride, and utilization of $CH_3CH:CH_2$ was 35 percent by volume of $CH_3CH:CH_2$ supply.

We claim:

1. A process for the perchlorination of methane, comprising reacting said methane, an oxygen containing gas, and a chlorinating agent selected from the group consisting of HCl, $Cl_2$ and mixtures of HCl and $Cl_2$, at 350° to 550° C. for from 10 to 20 seconds in contact with a catalyst impregnated in a porous material having a surface area of 0.3 to 30 m.²/g. and a porosity ranging from 0.1 to 0.8 cc./g., said catalyst being a member selected from the group consisting of a mixture of from 50 to 90 weight percent $CuCl_2$ and from 50 to 10 weight percent $LaCl_3$ and a mixture of from 50 to 90 weight percent $CuCl_2$, from 25 to 5 weight percent $LaCl_3$ and from 25 to 5 weight percent $LdCl_3$, Ld being a lanthanide selected from the group consisting of elements ranging from the 58th to the 71st element in the Periodic Table.

2. The method of claim 1 wherein the composition ratio by weight of Cu in $CuCl_2$ to La in $LaCl_3$ is 1:½ to ⅓.

3. The method of claim 1, wherein the composition ratio by weight of Cu in $CuCl_2$ to La in $LaCl_3$ and Ld in $LdCl_3$, Ld being as defined in said claim, is 1:½ to ⅓.

4. The method of claim 1 wherein the oxygen containing gas contains $O_2$ in the order of from 10 to 30 volume percent.

References Cited by the Examiner

UNITED STATES PATENTS

| | | | |
|---|---|---|---|
| 1,591,984 | 7/1926 | Krause et al. | 260—659 |
| 1,654,821 | 1/1928 | Krause et al. | 260—659 |
| 2,204,172 | 6/1940 | Balcar | 260—659 |
| 2,308,489 | 1/1943 | Cass | 260—659 |
| 2,327,174 | 8/1943 | Cass | 260—659 |
| 2,374,923 | 5/1945 | Cass | 260—659 |
| 2,379,414 | 7/1945 | Cass | 260—659 |
| 2,447,323 | 8/1948 | Fontana | 260—659 |
| 2,636,684 | 4/1953 | Pye et al. | 260—659 |
| 2,752,402 | 6/1956 | Pye | 260—659 |

FOREIGN PATENTS

| | | |
|---|---|---|
| 237,790 | 12/1959 | Australia. |
| 1,290,062 | 2/1962 | France. |

LEON ZITVER, *Primary Examiner.*

K. V. ROCKEY, *Assistant Examiner.*